Patented Jan. 11, 1938

2,105,407

UNITED STATES PATENT OFFICE 2,105,407

LIQUID INSULATING COMPOSITION

Frank M. Clark, Pittsfield, Mass., assignor to General Electric Company, a corporation of New York No Drawing. Original application May 25, 1935, Serial No. 23,403. Divided and this application September 24, 1936, Serial No. 102,985

5 Claims. (Cl. 252—1)

The present invention comprises an improvement in dielectric compositions of the type described in my prior Patents 1,931,373 and 1,931,455, patented October 17, 1933, namely, halogenated aryl compounds for use as dielectric and insulating materials in electric devices. It is the object of my present invention to further improve the chemical stability of such compositions.

Halogenated aryl compounds have been found to be chemically stable, no appreciable decomposition occurring under ordinary conditions even when such compounds are in direct contact with a metal. However, it has been found that when such compounds come in direct contact with an electric arc that some decomposition occurs accompanied by the evolution of hydrogen halide, as for example hydrogen chloride in the case of chlorinated compounds. In devices such as electric transformers in which arcing occurs only under exceptional and abnormal conditions the possibility of decomposition of chlorinated aryl hydrocarbon compounds is not a particularly troublesome contingency. However, in some electric devices, as for example electric circuit breakers, in which arcing occurs incidental to their normal operation the evolution of halogen halide presents a serious handicap to the use of such compositions. While hydrogen halide in any case is an undesirable compound to have in contact with electrical apparatus, it is particularly deleterious in the presence of moisture. For example, when moisture is present the hydrogen halide tends to become emulsified in the hydrocarbon composition. It decreases the dielectric strength of the composition in which it is present and may cause damage as by corrosion of metal parts of apparatus in which such composition is used.

It is the object of my present invention to render such hydrogen halide decomposition products innocuous. In accordance with my invention halogenated hydrocarbon dielectric and insulating compositions are mixed with a chemically unsaturated fixative which is miscible with such hydrocarbon and is capable of combining with hydrogen halide and perhaps other decomposition products, to form a material which is non-corrosive in the electrical devices or wherever such hydrocarbon compounds may be used.

Fixatives capable of use in accordance with my invention are unsaturated hydrocarbon compounds, such as terpenes, camphors and ethereal oils.

The outstanding useful property of compounds here under consideration is their affinity for hydrogen chloride, no solid precipitate being formed and no deleterious or poisonous gases being evolved. Apparently, a harmless addition product is formed which dissolves in the composition.

As above indicated, the fixatives are compounded with one or more liquid dielectric materials, such for example as chlorinated diphenyl, trichlor benzene, chlorinated diphenyl oxide, chlorinated naphthalene, chlorinated diphenyl methane, and others which may be termed generically chlorinated phenyl compounds.

Chemically unsaturated compounds which may be used, are usually classed chemically as terpenes and camphors. Representative compounds of this class are (a) the open chain olefinic terpenes and camphors (isoprene, citronellal, citral, geraniol), (b) monocyclic terpenes and camphors (dipentene, terpinene), (c) complex cyclic terpenes and camphors (pinene). Certain ethereal oils consisting chiefly of compounds of this type may be employed in accordance with this invention. Such oils are oil of turpentine, oil of citron, orange oil, and oil of thyme.

When such fixatives are used in the halogenated aromatic compositions it is usually sufficient to employ about 1 to 10 per cent of the fixative ingredient, ordinarily 5 per cent being a suitable amount. A materially larger proportion of unhalogenated fixative may impart some degree of inflammability to the otherwise noninflammable composition. The determining factor is the proportion of hydrogen which is given off by these fixatives when decomposed by the electric arc. This hydrogen is entirely eliminated if the fixative compound, or mixture, which is used contains halogen in chemical equivalent to the hydrogen content.

In a copending application Serial No. 23,404, filed May 25, 1935, I have described and claimed dielectric materials comprising nitrile compounds and in particular halogenated benzyl cyanide as a new material adapted for insulating and dielectric uses. In parent application Serial No. 23,403, filed May 25, 1935, of which this application is a division, claims are made on fixatives consisting of nitrile compounds.

What I claim as new and desire to secure by Letters Patent of the United States is:

1. A composition of matter comprising as substantial ingredients halogenated aryl compound and a substantial fixative ingredient of the class consisting of about one to ten per cent terpenes, camphors and ethereal oils.

2. A composition of matter comprising as substantial ingredients chlorinated aryl compound and at least about one per cent of material in the class consisting of open chain olefinic terpenes and camphors; monocyclic terpenes and camphors; complex cyclic terpenes and camphors; and oils of turpentine, citron, orange and thyme.

3. A dielectric and insulating composition made up of a preponderant proportion of chlorinated aryl constituent and about one to ten percent of turpentine oil.

4. A dielectric and insulating composition made up of a preponderant proportion of chlorinated aryl constituent and about one to ten per cent of pinene.

5. A composition of matter including a preponderant ingredient chlorinated di-phenyl and about 1 to 10 per cent of a fixative of the class consisting of terpenes, camphors and ethereal oils.

FRANK M. CLARK.